US008806590B2

(12) United States Patent
Salada et al.

(10) Patent No.: US 8,806,590 B2
(45) Date of Patent: Aug. 12, 2014

(54) SIGNED EPHEMERAL EMAIL ADDRESSES

(75) Inventors: Charles R. Salada, Redmond, WA (US); Mayerber Carvalho Neto, Bellevue, WA (US); Charlie Chung, Redmond, WA (US); Mayank Mehta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1141 days.

(21) Appl. No.: 12/143,819

(22) Filed: Jun. 22, 2008

(65) Prior Publication Data

US 2009/0320109 A1 Dec. 24, 2009

(51) Int. Cl.
*H04L 29/06* (2006.01)

(52) U.S. Cl.
USPC ............... 726/6; 709/206; 709/245; 713/154; 713/170; 726/7; 726/28

(58) Field of Classification Search
USPC .............................................................. 726/6
See application file for complete search history.

(56) References Cited

U.S. PATENT DOCUMENTS

| 6,760,752 | B1 * | 7/2004 | Liu et al. ...................... 709/206 |
| 7,020,650 | B2 * | 3/2006 | Sato et al. .............................. 1/1 |
| 7,092,992 | B1 * | 8/2006 | Yu ................................. 709/206 |
| 7,127,606 | B2 * | 10/2006 | Wheeler et al. ............... 713/156 |
| 7,237,717 | B1 * | 7/2007 | Rao et al. ....................... 235/386 |
| 8,055,716 | B2 * | 11/2011 | Morgan et al. ................. 709/206 |
| 8,103,724 | B2 * | 1/2012 | Dawson et al. ................. 709/206 |
| 2002/0026575 | A1 * | 2/2002 | Wheeler et al. ............... 713/156 |
| 2002/0065828 | A1 * | 5/2002 | Goodspeed ................... 707/100 |
| 2002/0087641 | A1 * | 7/2002 | Levosky ........................ 709/206 |
| 2002/0138581 | A1 * | 9/2002 | MacIntosh et al. ........... 709/206 |
| 2003/0191969 | A1 * | 10/2003 | Katsikas ........................ 713/201 |
| 2003/0195937 | A1 * | 10/2003 | Kircher et al. ................. 709/207 |
| 2004/0024823 | A1 * | 2/2004 | Del Monte .................... 709/206 |
| 2004/0111367 | A1 * | 6/2004 | Gallagher et al. ............... 705/39 |
| 2004/0148356 | A1 * | 7/2004 | Bishop et al. ................. 709/206 |
| 2004/0215721 | A1 * | 10/2004 | Szeto et al. .................... 709/204 |
| 2004/0243844 | A1 * | 12/2004 | Adkins .......................... 713/201 |
| 2005/0114453 | A1 * | 5/2005 | Hardt ............................ 709/206 |

(Continued)

OTHER PUBLICATIONS

Owen, D., 'An Application Agnostic Review of Current Spam Filtering Techniques', Daniel Owen, Aug. 27, 2007, entire document, http://hosteddocs.ittoolbox.com/050211Spam_Filtering_Techniques.pdf.*

(Continued)

*Primary Examiner* — Bradley Holder
*Assistant Examiner* — Ronald Baum
(74) *Attorney, Agent, or Firm* — Louise Bowman; Brian Haslam; Micky Minhas

(57) ABSTRACT

Architecture for generating a temporary account (e.g., an email address) with a user-supplied friendly name and a secret used to the sign the temporary account. For example, when a user wishes to create a temporary email address to use with an online organization, a friendly name is provided and the system generates a temporary email address including the friendly name. A signing component signs the temporary email address with a secret. One or more of these secrets can be provisioned prior to the user's creation of a friendly name, which eliminates propagation delay. During use, only incoming email messages having the temporary email address signed with the secret are validated. When the user revokes the temporary email address, the secret is revoked and the revocation is propagated to network gateways, rejecting any email sent to that address.

19 Claims, 13 Drawing Sheets

(56) References Cited

U.S. PATENT DOCUMENTS

| | | |
|---|---|---|
| 2005/0198518 A1 | 9/2005 | Kogan et al. |
| 2005/0201536 A1 | 9/2005 | LaLonde et al. |
| 2005/0204011 A1 | 9/2005 | Velayudham |
| 2005/0210107 A1* | 9/2005 | Mora ........................... 709/206 |
| 2005/0262353 A1* | 11/2005 | Gentry et al. ................. 713/176 |
| 2005/0268100 A1* | 12/2005 | Gasparini et al. ............. 713/170 |
| 2006/0041621 A1* | 2/2006 | Libbey .......................... 709/206 |
| 2006/0059004 A1* | 3/2006 | Ussery et al. ..................... 705/1 |
| 2006/0129644 A1* | 6/2006 | Owen et al. ................... 709/206 |
| 2006/0173962 A1* | 8/2006 | Ylonen ......................... 709/206 |
| 2006/0200669 A1 | 9/2006 | Tribble et al. |
| 2006/0206425 A1* | 9/2006 | Sharma .......................... 705/40 |
| 2007/0011252 A1 | 1/2007 | Taylor |
| 2007/0067400 A1 | 3/2007 | Kawakami et al. |
| 2007/0143407 A1* | 6/2007 | Avritch et al. ................ 709/206 |
| 2007/0228161 A1* | 10/2007 | Fletcher ........................ 235/380 |
| 2007/0286220 A1* | 12/2007 | Stenning ....................... 370/412 |
| 2008/0065878 A1* | 3/2008 | Hutson et al. ................ 713/153 |
| 2008/0172468 A1* | 7/2008 | Almeida ........................ 709/206 |
| 2008/0282338 A1* | 11/2008 | Beer ................................ 726/12 |
| 2009/0044013 A1* | 2/2009 | Zhu et al. ...................... 713/170 |

OTHER PUBLICATIONS

Comodo, 'Comodo SecureEmail User Guide', © 2011 Comodo CA Limited, entire document, http://help.comodo.com/uploads/helpers/Comodo_SecureEmail_User%20Guide_2.6.pdf.*

Perlman, "The Ephemerizer: Making Data Disappear", Feb. 2005, Sun Microsystems, Inc.

Watson, "Beyond Identity: Addressing Problems that Persist in an Electronic Mail System with Reliable Sender Identification", In Proceedings of the First Conference on Email and Anti-Spam (CEAS), 2004.

Seigneur, et al., "Combating Spam with TEA (Trustworthy Email Addresses)", Proceedings 2nd Annual Conference on Privacy, Security and Trust, Fredericton, Oct. 2004.

Finch, "Bounce Address Protection for Email", Presented at the UKUUG LISA Winter Conference on Security Networks, Feb. 2005.

"How Spamgourmet Works".

* cited by examiner

SIGNED EPHEMERAL EMAIL ADDRESSES

BACKGROUND

Email users are often prompted to give their email addresses to various organizations in order to setup an account for online transactions. Some of these organizations are potentially untrustworthy, and in return, can send unwanted communications or disseminate the email addresses to third parties, which may further abuse the email address. Blocking the original untrustworthy organization does not guard against the third parties. Moreover, revoking the email address prevents communication with legitimate senders, resulting in inconvenience for the user and entities seeking communications with the user.

One technique that attempts to defeat this problem is for the user to create a temporary address for use only with this organization, rather than exposing a user's main email address. However, in email server systems, there can be a propagation delay in creating a new email address and informing all the gateways of the new temporary address. If the user submits a new email address to an organization, the gateways at the email network system will reject any incoming emails until propagation is complete and the new email address is valid.

It is a known technique to generate one or more temporary addresses for each user in advance, before the addresses are needed. However, the user can neither select the new temporary addresses, nor can the temporary addresses be tailored to the organization to which the addresses will be submitted. Thus, the previously-generated temporary addresses are difficult for the user to remember and identify, since the machine-generated addresses do not include user-friendly nomenclature.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, architecture is disclosed for creating an ephemeral email address that can be given to an organization or other party and which can be revoked by the user. An email network system generates one or more secrets associated with a user that can be used to sign an email address. These secrets are propagated to the network gateways.

When the user requests a new email address, the user provides a friendly name and the system generates a signed version of the address ready for use. The gateway does not need a record of the friendly name or the full address in advance. Rather, the gateway can recognize the secret portion included in the email address and thereby accept mail at that address. In the event that the user wishes to revoke the address, the system revokes the secret and the revocation is propagated to the gateways. Email sent to the address thereafter will be rejected.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
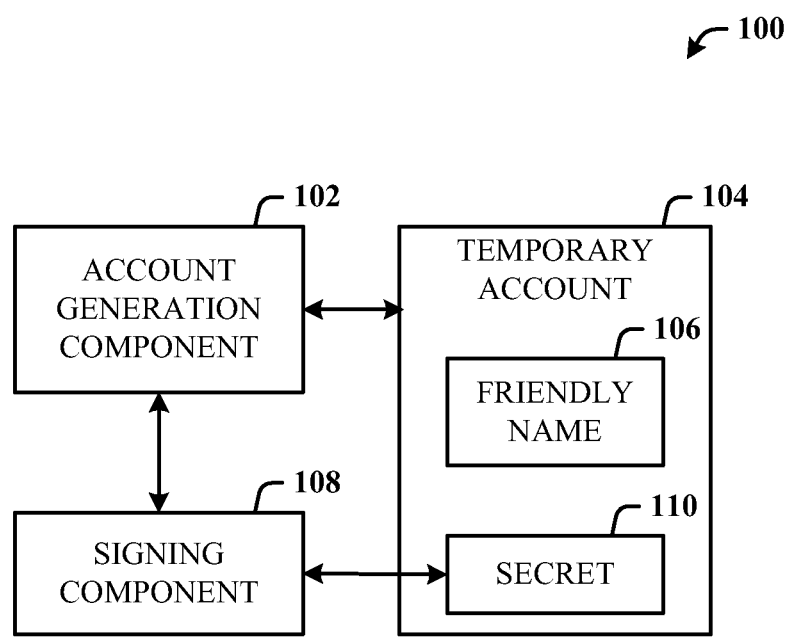
FIG. 1 illustrates a computer-implemented system for generating a temporary account with a user-supplied friendly name.

The disclosed architecture relates to a computer-implemented system for generating a temporary account (e.g., an email address) with a user-supplied friendly name and a secret used to the sign the temporary account. For example, when a user desires to create a temporary email address to use with an online organization, a friendly name is provided and the system generates a temporary email address that includes the friendly name. A signing component signs the temporary email address with a secret. One or more of these secrets can be provisioned prior to the user's creation of a friendly name, which reduces propagation delay. During use, only incoming email messages having the temporary email address signed with the secret are validated. When the user revokes the temporary email address, the secret is revoked and the revocation is propagated to network gateways, rejecting any email sent to that address.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for generating a temporary account with a user-supplied friendly name. In one implementation, the system 100 is deployed for use with an email system. However, the system 100 can also be used with any type of messaging system, such as instant messaging, text messaging, etc., in creating any sort of online user account, or in any online situation where a user establishes identity.

As illustrated in FIG. 1, the system 100 includes an account generation component 102 for generating a temporary account 104 with a user-supplied friendly name 106. The system 100 also includes a signing component 108 for signing the temporary account 104 with a secret 110.

For example, if the user wishes to setup an online account at a store, the friendly name 106 can be the name of the store. If the store is "The Nobody Store," the user can supply the word "nobody." The account generation component 102 generates the temporary account 104 with the name "nobody." The signing component 108 adds a signature into the account that includes the secret 110. The user specifies the "nobody" account but the network gateway has not yet been notified of an account including this word. However, since the signature includes the secret 110, the gateway recognizes this component of the account and will accept messages containing the secret 110.

In an alternative implementation, the secrets can be indexed such that the index is part of the email address. Thus, validation will then include processing the index to obtain the secret, and then processing the secret. In yet another embodiment, the email address can be signed based on the user allowed to use the address. For example, when requesting a temporary email address, the user can request the email address be called Contoso, but then restrict the access of the address to contoso.com. When validating, the gateway then looks up the secret in the gateway address book, looks up the domain name contoso.com, and then validates the signature based on both the secret and domain name.

Figure 2:
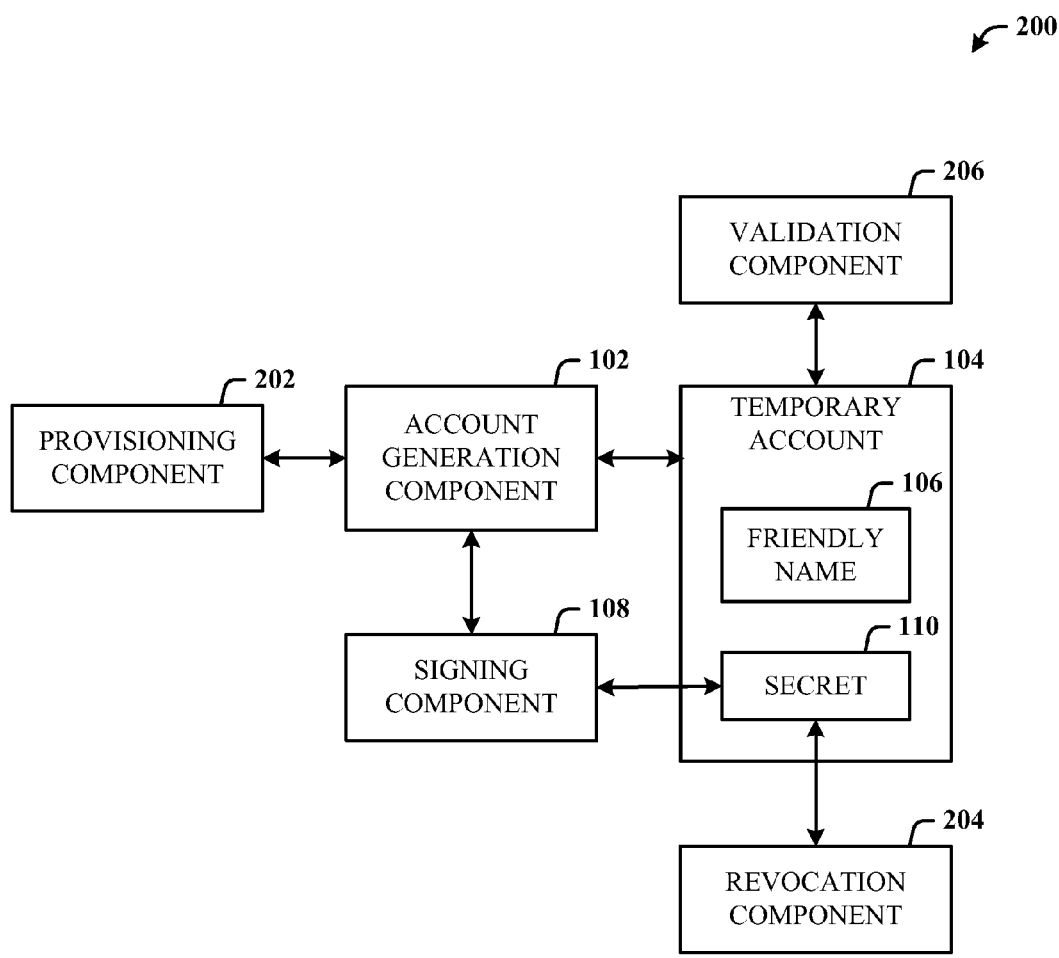
FIG. 2 illustrates an alternative embodiment of a computer-implemented system for generating a temporary account with a user-supplied friendly name, including additional exemplary aspects.

FIG. 2 illustrates an alternative embodiment of a computer-implemented system 200 for generating the temporary account 104 with the user-supplied friendly name 106, including additional exemplary aspects. A provisioning component 202 can be included for provisioning the secret 110 associated with the temporary account 104 prior to creation of the friendly name 106. Multiples of the temporary account 104 can be created in this way by a service provider upon creation of a particular user account within the system 200. Alternatively, the provisioning component 202 can provision one or more temporary accounts at any time prior to the generating of the temporary account 104 with the user-supplied friendly name 106.

The temporary account 104 can be a temporary email address, as especially used for providing a login for an online organization. However, it is to be appreciated that the temporary account can also be an instant messaging account address, a text messaging account address, or any other sort of online user account address where login credentials are provided for a user to establish identity.

As illustrated in FIG. 2, the system 200 can also include a revocation component 204 for revoking the secret 110 in response to a user choosing to revoke the temporary account 104. In the above example, if the temporary account 104 is an email account, and if a volume of spam is received at the associated email address, the user can instruct the system 200 to revoke the secret 110. Upon revocation, the gateways will then deny access to any received messages with the revoked secret. In this way, the user is given control over undesired messages that may be received from an unreliable organization or any other third party which obtained the temporary account 104.

As also illustrated in FIG. 2, the system 200 can also include a validation component 206 for validating the temporary accounts 104 signed with the secret 110. The validation component 206 can reside on the gateway through which messages are processed. For example, in an email application, the validation component 206 can be operational internal to a network firewall or spam filter. Alternatively, or in combination therewith, the validation component 206 can reside within or in association with a client application. For example, in an email application, the validation component 206 can be used to route unwanted messages to a spam or "junk email" folder; alternatively, a component in a resident anti-virus application.

Figure 3:
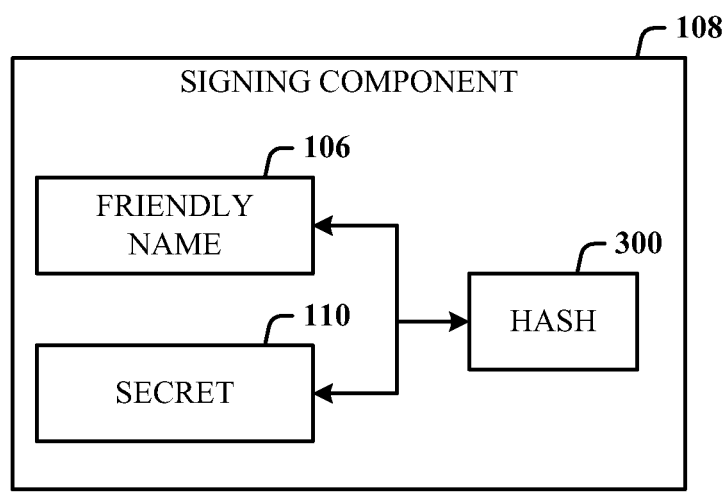
FIG. 3 illustrates an alternative embodiment of a signing component used with the computer-implemented system.

FIG. 3 illustrates an alternative embodiment of the signing component 108 used with the computer-implemented system 200. In one aspect, the signing component 108 concatenates the secret 110 with the friendly name 106 and generates a hash 300 of the secret 110 and friendly name 106. Any suitable signing algorithm can be employed. The secret 110 (e.g., a string such as SSS1) and friendly name 106 can be placed together (e.g., SSS1nobody). An SHA-1 hashing algorithm can be used to compute the hash 300, for example. Any suitable hashing algorithm can be employed.

Alternatively, the signing component 108 can combine the secret 110 with the friendly name 106 in any suitable manner. For example, the characters in the friendly name 106 can be reversed before concatenating the friendly name 106 with the secret. Alternatively, any suitable cryptographic method can be employed, for example, public key cryptography. The signed temporary account 104 can include the secret 110, the friendly name 106, and the hash 300. Additional description is provided hereinbelow.

Figure 4:
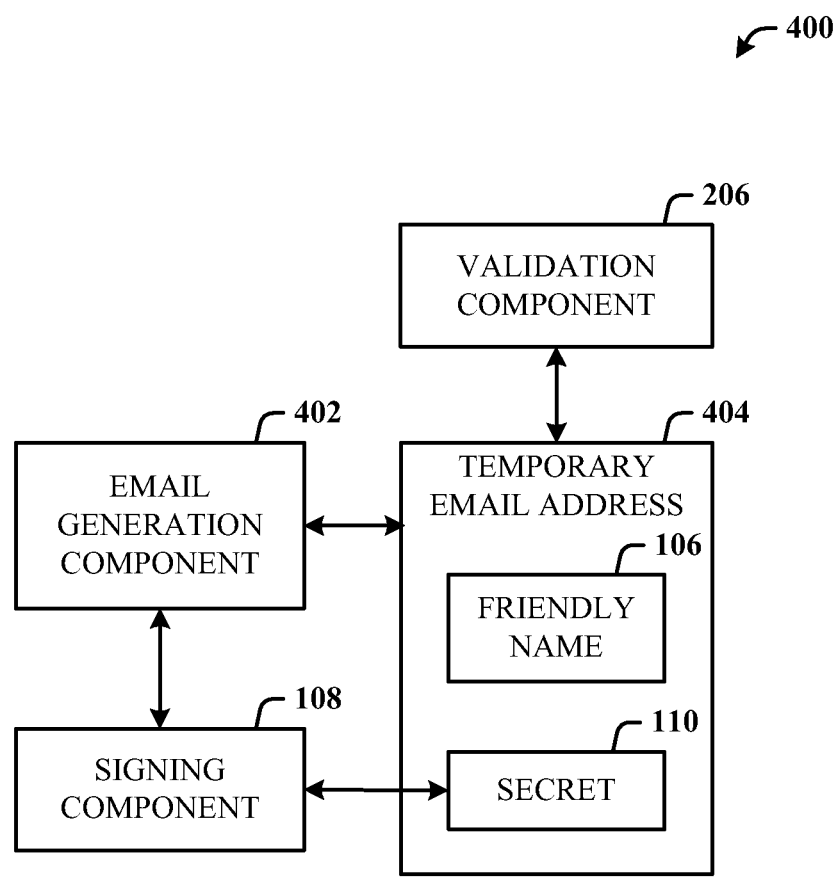
FIG. 4 illustrates another alternative embodiment of a computer-implemented messaging system for generating a temporary email address with a user-supplied friendly name.

FIG. 4 illustrates another alternative embodiment of a computer-implemented messaging system 400. An email generation component 402 is provided for generating a temporary email address 404 with the user-supplied friendly name 106. The signing component 108 signs the temporary email address 404 with the secret 110. The validation component 206 validates incoming email messages having the temporary email address 404 signed with the secret 110.

Figure 5:
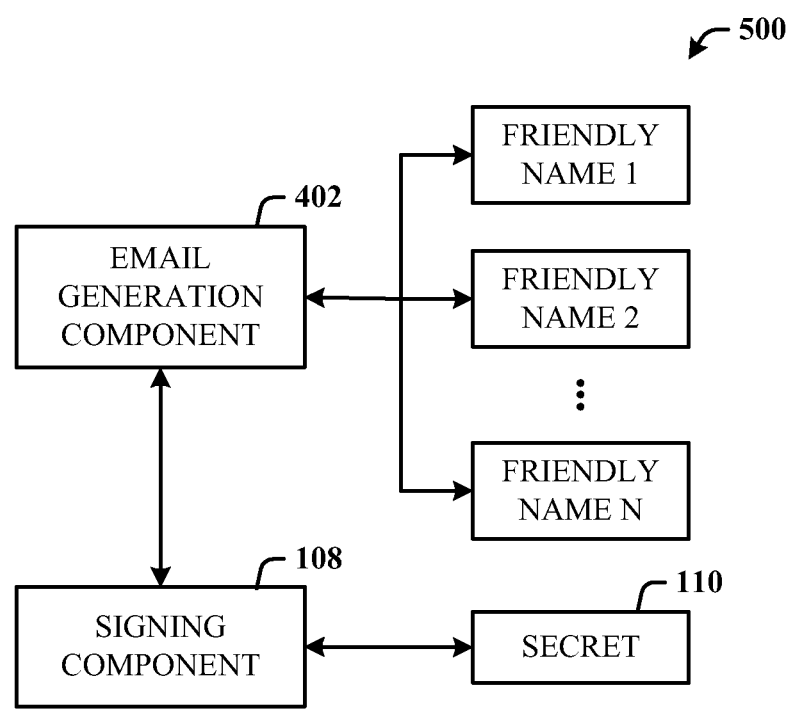
FIG. 5 illustrates yet another alternative embodiment of a computer-implemented messaging system for generating a plurality of temporary email addresses from a single secret.

FIG. 5 illustrates yet another alternative embodiment of the computer-implemented system 400 for generating temporary email addresses from a single secret associated with the user. The signing component 108 generates the single secret 110. The email generation component 402 generates temporary email addresses that correspond to user-supplied friendly names 500, all using the single secret 110.

In producing one secret 110 per user, when the user requests the temporary email address 404, the user receives a signed address, which signed address is then sent to the gateway. Upon receiving an email to the temporary email address 404 at the gateway, the validation component 206 confirms whether the address has propagated to the address book. If the temporary email address 404 has propagated, the validation component 206 accepts the email. If the temporary email address has not propagated, the validation component 206 looks up the secret 110 in the address book and confirms whether the address 404 is signed with the secret 110. If so, the signed email is validated and accepted. Upon revocation, the temporary email address 404 is removed from the address book and the signature is invalidated. The gateway will thereafter reject any messages containing the revoked secret.

Figure 6:
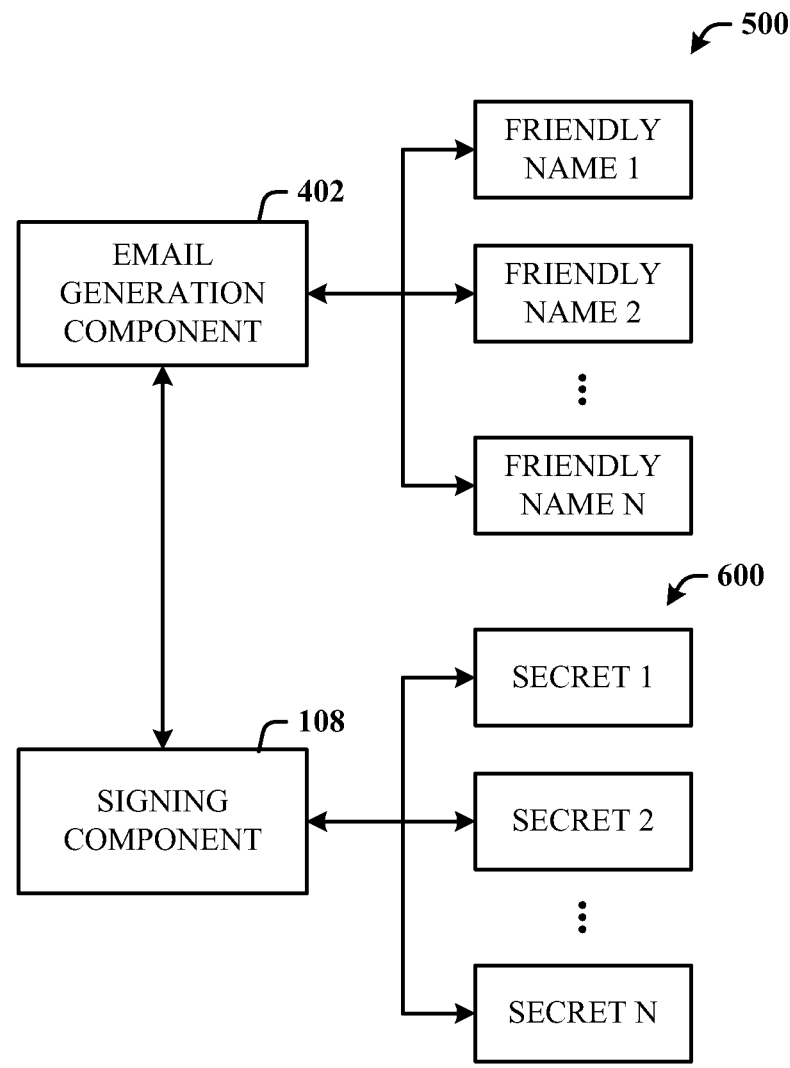
FIG. 6 illustrates still another alternative embodiment of a computer-implemented messaging system for generating a plurality of temporary email addresses from a respective plurality of secrets.

FIG. 6 illustrates still another alternative embodiment of the computer-implemented system 400 for generating temporary email addresses from a respective number of secrets associated with the user. Although described in the context of system 400 of FIG. 4, the embodiment applies equally well to other systems described herein. The signing component 108 generates multiple secrets 600. The email generation component 402 generates multiples of the temporary email address 404, each having corresponding user-supplied friendly names 500, and each using a respective secret of the secrets 600.

In producing the multiple secrets 600 per user, when the user requests a new temporary email address, an unused secret of the secrets 600 is selected and used to sign the temporary address 404. Upon receiving an email to the temporary email address 404 at the gateway, the validation component 206 looks up the user's secrets in the address book and decodes the incoming address using all available secrets 600. If at least one of the secrets 600 is valid, the validation component 206 accepts the email. If none of the secrets 600 is valid, the email is rejected permanently and the gateway will reject further emails containing the revoked secret.

In an alternative implementation as indicated hereinabove where the secrets are indexed such that the index is part of the email address, the incoming email address can be decoded using the secret corresponding to that index instead of decoding all available secrets. In this way, efficiency is improved by reducing processing costs.

In a practical implementation, user-specific actions such as selecting a friendly name 106 are executed on the user's specific mailbox server. The information for accepting Internet email used by the validation component 206 is then propagated to each gateway server. The provisioning of the secrets 600 is advantageous because it enables clear decisionmaking on message acceptance at the gateway, thereby enhancing security. Provisioning also reduces load on the internal network by preventing unwanted data such as spam from being retransmitted past the gateway. Additionally, if one of the secrets 600 is cracked for one email address, this does not affect the other email addresses, thereby further enhancing security.

Figure 7:
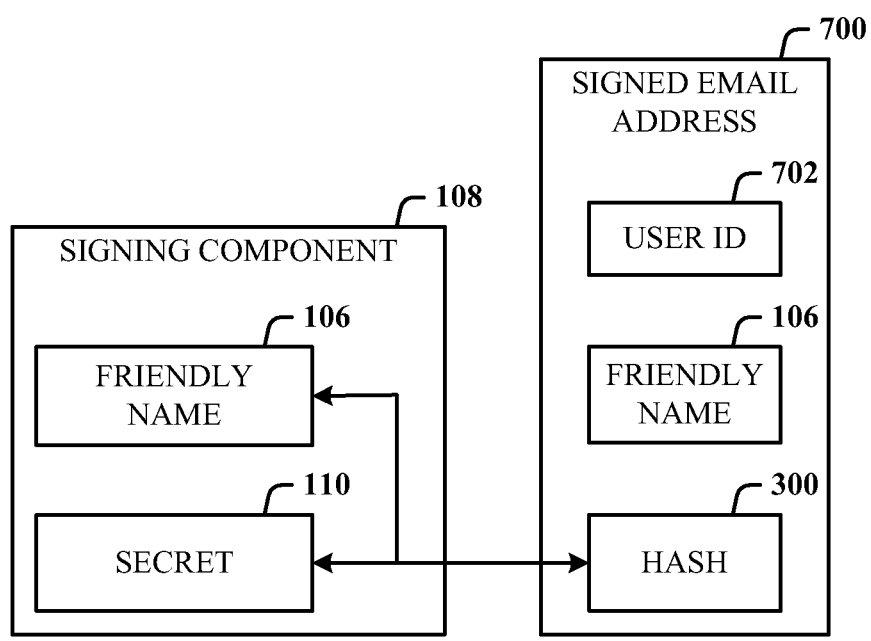
FIG. 7 illustrates an embodiment of a signing component for generating a signed email address as used with the computer-implemented messaging system.

FIG. 7 illustrates an embodiment of the signing component 108 for generating a signed email address 700. Although described in the context of system 400 of FIG. 4, the embodiment applies equally well to other systems described herein. The signing component 108 uses the user-supplied friendly name 106 and the secret 110 as described hereinabove. The signing component 108 returns the signed email address 700 that included a user identifier (ID) 702, the user-supplied friendly name 106, and an encrypted string which include the secret 110. The encrypted string can include the hash 300 generated from a concatenation of the secret 110 with the friendly name 106.

The signing component 108 creates the signed email address 700 in the following manner. Each user address book can have a specific user identifier 702 associated with the particular user. For example, the user identifier 702 can be a specific tag such as A17 that is only used for that user. Multiples of the secret 110 can also be maintained in the address book (e.g., SSS1, SSS2, etc.). The user identifier 702 and the secret 110 are propagated to all gateways.

Alternatively, rather than assigning a single tag to a single user as the user identifier 702, the same tag can be assigned to multiple users for validating addresses at the gateway. For multiple users with the same tag, when validating an email address, the validation component 206 selects the set of all users that have the given tag and the secret 110 associated with each those particular users. For each secret 110, the email address is validated according to that secret 110. If at least one of the secrets validates successfully, the validation component 206 accepts the email address as valid.

When the user requests a new "ephemeral" or temporary email address 404, the user provides the friendly name 106. If the user is creating an account with The Nobody Store as in the example mentioned hereinabove, the friendly name 106 can be "nobody." Upon receiving this request, the signing component 108 selects the secret 110 (e.g., SSS1), looks up the user identifier 702 (e.g., A17), and signs the friendly name 106 using the secret 110.

As mentioned hereinabove, the signing algorithm concatenates the secret 110 and the friendly name 106, and generates the hash 300, which may be "1AF3." The signing component 108 then returns the signed email address 700 of A17-nobody-1AF3@userdomain.com to the user. The user then provides this new address to The Nobody Store online website. Alternatively, as mentioned hereinabove, the signing algorithm can combine the secret 110 with the friendly name 106 in any suitable manner other than concatenation.

The Nobody Store sends an email to A17-nobody-1AF3@userdomain.com, which then gets validated at the gateway by the validation component 206. The validation component 206 uses the user identifier 702 (e.g., the tag A17) to look up the secret 106. The friendly name 106 is concatenated with the secret 106 and the resulting string is hashed. The hash 300 is compared with the signature indicated in the email address being validated (e.g., 1AF3).

If the hash 300 and the signature match, the email address 700 is thus found to be signed and valid. The validated email is then forwarded to the user. In the event that the user wishes to terminate the signed email address 700, the user requests that the secret 110 be revoked. The revocation component 204 revokes the secret 110, and further mail to that address 700 is rejected at the gateway.

Alternatively, the system can be implemented so that the user's mailbox includes the signing component 108 and the provisioning component 202. Upon revocation of the secret 110, the gateway experiences a propagation delay before revoked email messages can be rejected at the gateway. However, the mailbox immediately rejects revoked email. In this way, the user experiences both provisioning and revocation as immediate events despite the propagation delay between the mailbox and the gateway.

Figure 8:
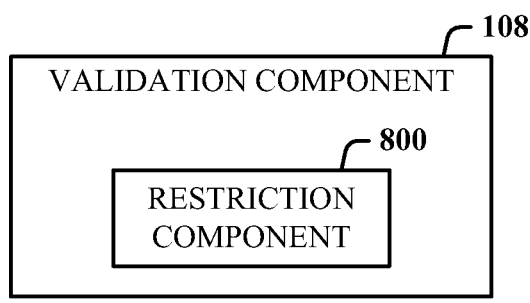
FIG. 8 illustrates an alternative embodiment of a validation component used with the computer-implemented messaging system.

FIG. 8 illustrates an alternative embodiment of the validation component 206. Although described in the context of system 400 of FIG. 4, the embodiment applies equally well to other systems described herein. The validation component 206 can include a restriction component 800 for restricting incoming email messages. The restriction component 800 adds an additional layer of security by only allowing email to a particular address emanating from a specified Internet domain.

Further to the aforementioned example, the "nobody" email address can be restricted to the domain of The Nobody Store (e.g., thenobodystore.com). In addition to comparing the secret 110 as discussed hereinabove, the restriction component 800 looks up the sender's email address to ensure that the email address emanates from thenobodystore.com. The restriction component 800 uses the secret 110 and the domain to validate the email, and thereby restrict access to the sender's domain. In this way, unwanted messages from third party senders are eliminated.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 9:
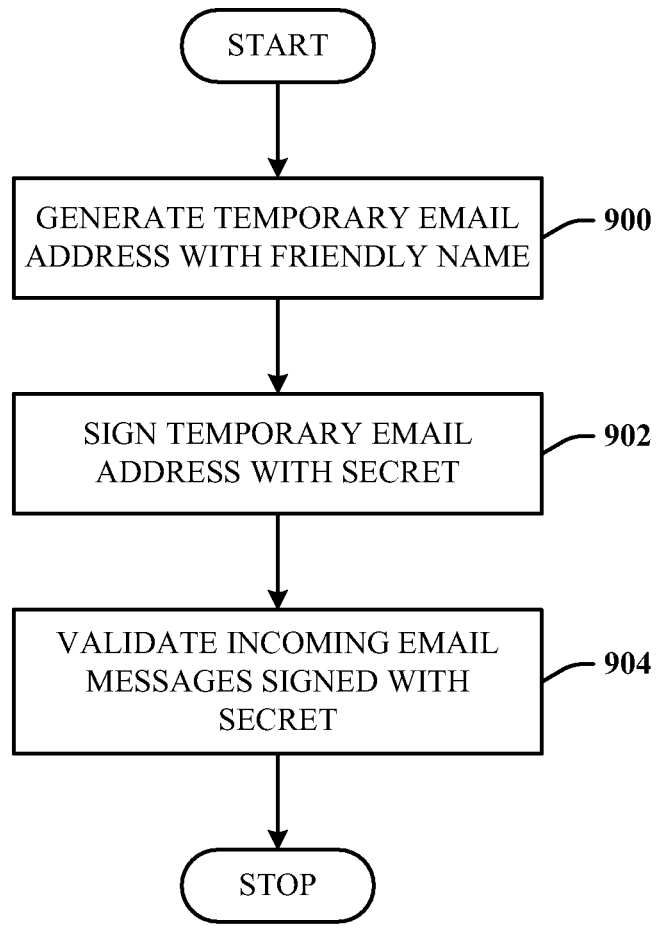
FIG. 9 illustrates an exemplary computer-implemented messaging method.

FIG. 9 illustrates a computer-implemented method of messaging. At 900, a temporary email address is generated with a friendly name (e.g., user-supplied). At 902, the temporary email address is signed with a secret. At 904, incoming email messages signed with the secret are validated. The secret is not displayed in the email address in such a way that a "spammer" can learn the secret. Rather, the secret can be encrypted and the encrypted string can be added to the email address.

Figure 10:
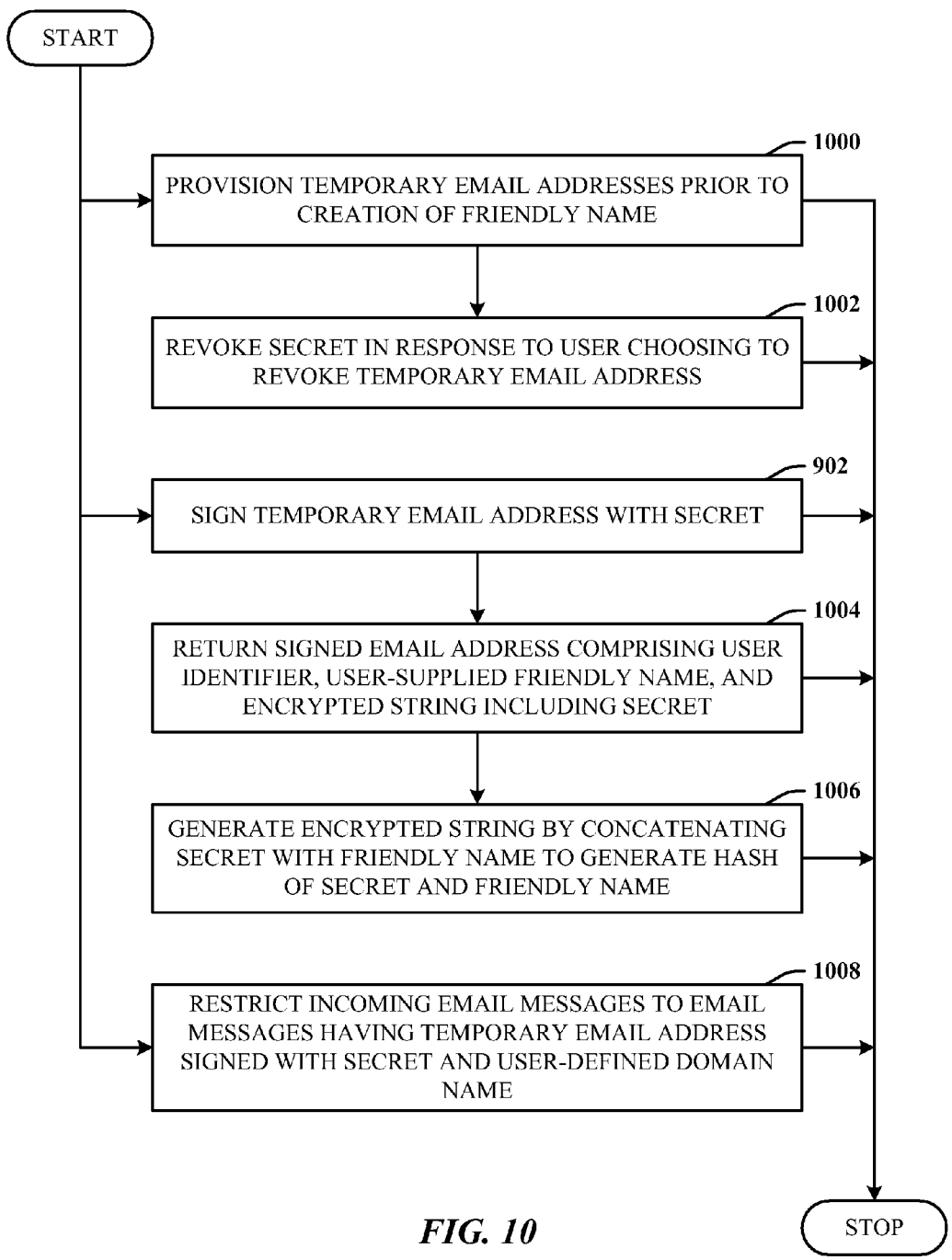
FIG. 10 illustrates further exemplary aspects of the computer-implemented messaging method.

FIG. 10 illustrates further exemplary aspects of the computer-implemented messaging method. At 1000, the temporary email addresses are provisioned prior to creation of a friendly name. The temporary addresses can be provisioned by creating one or more secrets that are maintained at the messaging system. The temporary accounts can be created upon creation of a particular user account within a messaging server provider system. Alternatively, a temporary email address can be provisioned at any time prior to the generating of the temporary email address with the user-supplied friendly name.

FIG. 10 also illustrates at 1002 that the secret can be revoked in response to a user (or other system entity) choosing to revoke the temporary email address. As mentioned hereinabove, if a volume of spam is received at the email address, the user can instruct the system to revoke the secret, and thereby revoke the temporary email address. Upon revocation, the gateways will then deny access to any received messages with the revoked secret.

Following the signing of the temporary email address with a secret at 902, the signing can include returning a signed email address comprising a user identifier, the user-supplied friendly name, and an encrypted string including the secret, as indicated at 1004. At 1006, the encrypted string can be generated by concatenating the secret with the friendly name to generate a hash of the secret and the friendly name.

At 1008, incoming email messages are restricted to email messages having the temporary email address signed with the secret and a user-defined domain name. This provides an additional layer of security by only allowing email at a particular address emanating from a specified Internet domain to be received, thereby eliminating unwanted messages from third party senders.

Figure 11:
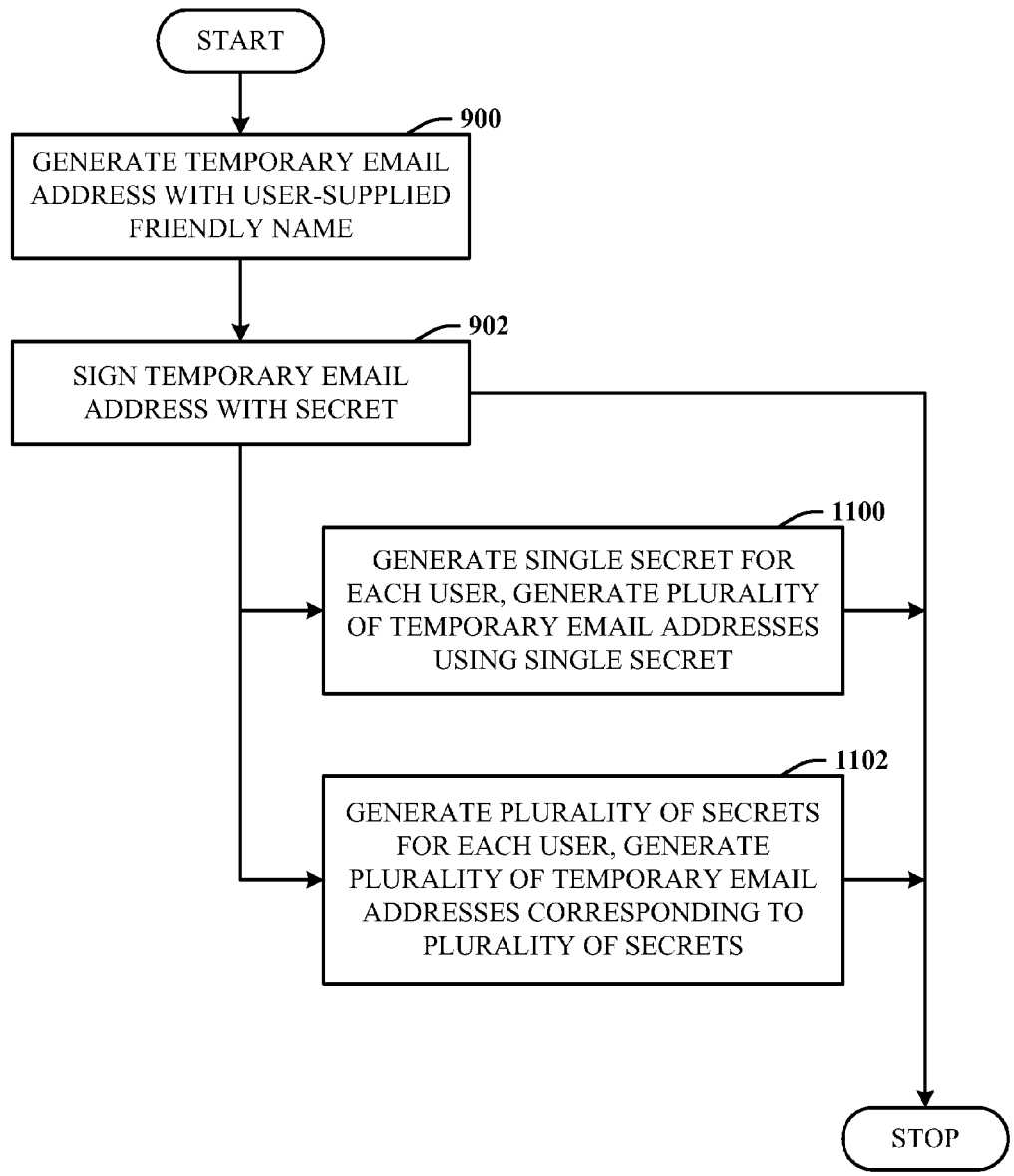
FIG. 11 illustrates further exemplary aspects of temporary email address generating and signing operations in the computer-implemented messaging method.

FIG. 11 illustrates further exemplary aspects of temporary email address generating and signing operations in a computer-implemented messaging method. Further to the generating a temporary email address, at 900, and signing the email address, at 902, the method illustrates that the signing includes generating a single secret for each user, as indicated at 1100. Additionally at 1100, generating the temporary email address includes generating multiple temporary email addresses using the single secret. In this way, a number of friendly names can be provided by the user to be validated with a single secret.

FIG. 11 also illustrates, at 1102, that the signing can include generating secrets for each user. Additionally at 1102, generating the temporary email address comprises generating temporary email addresses corresponding to the number of secrets. In this way, each friendly name can have its own secret, and the revocation of a single secret only invalidates the single temporary email address, rather than all the temporary email addresses.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 12:
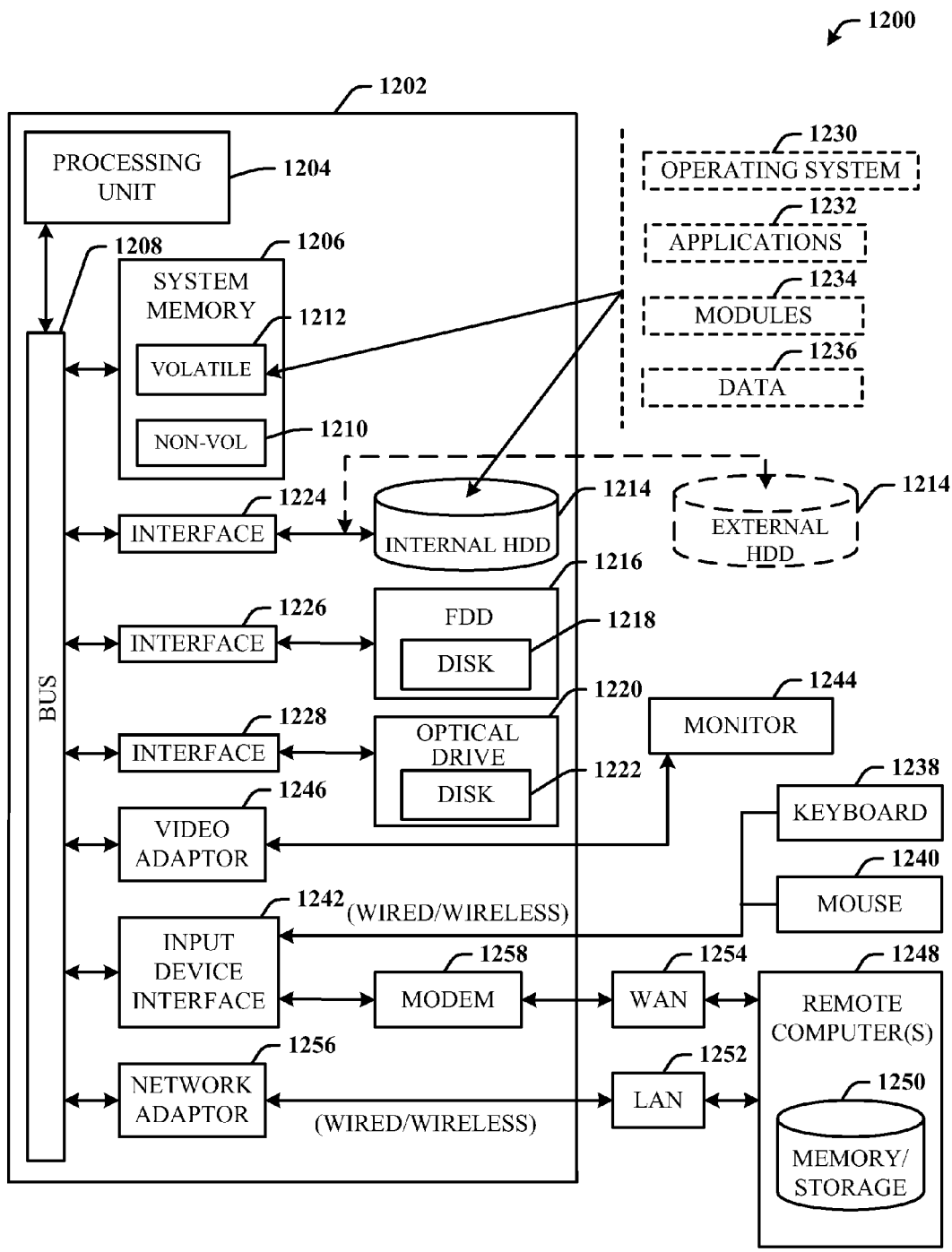
FIG. 12 illustrates a block diagram of a computing system operable to execute messaging in accordance with the disclosed architecture.

Referring now to FIG. 12, there is illustrated a block diagram of a computing system 1200 operable to execute the computer-implemented system 100 in accordance with the disclosed architecture. In order to provide additional context for various aspects thereof, FIG. 12 and the following discussion are intended to provide a brief, general description of a suitable computing system 1200 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202 having a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 can include non-volatile memory (NON-VOL) 1210 and/or volatile memory 1212 (e.g., random access memory (RAM)). A basic input/output system (BIOS) can be stored in the non-volatile memory 1210 (e.g., ROM, EPROM, EEPROM, etc.), which BIOS are the basic routines that help to transfer information between elements within the computer 1202, such as during start-up. The volatile memory 1212 can also include a high-speed RAM such as static RAM for caching data.

The computer 1202 further includes an internal hard disk drive (HDD) 1214 (e.g., EIDE, SATA), which internal HDD 1214 may also be configured for external use in a suitable chassis, a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as a DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1212, including an operating system 1230, one or more application programs 1232, other program modules 1234, and program data 1236. All or portions of the operating system, applications, modules, and/or data can also be cached in the volatile memory 1212. It is to be appreciated that the disclosed architecture can be implemented with various commercially available operating systems or combinations of operating systems.

The aforementioned application programs 1232, other program modules 1234, and program data 1236 can include the computer-implemented system 100, the account generation component 102, the temporary account 104, the user-supplied friendly name 106, the signing component 108, and the secret 110 from FIG. 1, the computer-implemented system 200, the provisioning component 202, the revocation component 204, and the validation component 206 from FIG. 2, and the hash 300 from FIG. 3.

The application programs 1232, other program modules 1234, and program data 1236 can also include the computer-implemented messaging system 400, the email generation component 402, and the temporary email address 404 from FIG. 4, the signed email address 700, and the user identifier 702 from FIG. 7, and the restriction component 800 from FIG. 8.

A user can enter commands and information into the computer 1202 through one or more wire/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, etc.

A monitor 1244 or other type of display device is also connected to the system bus 1208 via an interface, such as a video adaptor 1246. In addition to the monitor 1244, a computer typically includes other peripheral output devices (not shown), such as speakers, printers, etc.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, is connected to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802.x family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 13:
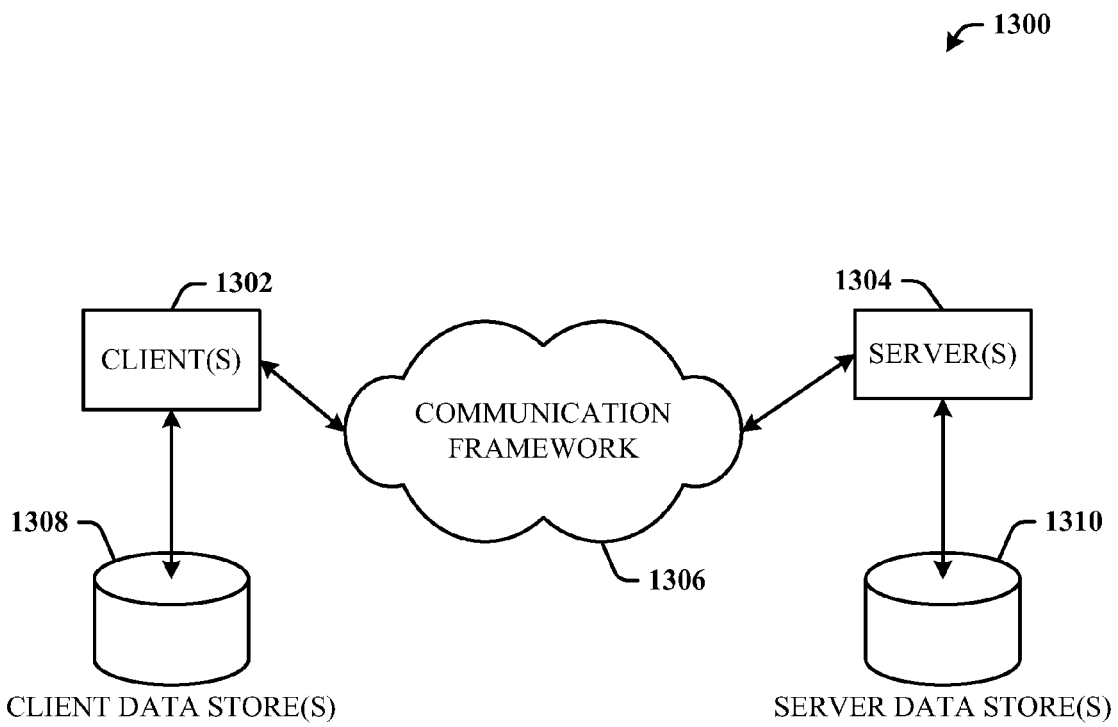
FIG. 13 illustrates an exemplary computing environment operable to execute a messaging method.

Referring now to FIG. 13, there is illustrated a schematic block diagram of an exemplary computing environment 1300 that interacts with the computer-implemented systems described herein. The environment 1300 includes one or more client(s) 1302. The client(s) 1302 can be hardware and/or software (e.g., threads, processes, computing devices). The client(s) 1302 can house cookie(s) and/or associated contextual information, for example.

The environment 1300 also includes one or more server(s) 1304. The server(s) 1304 can also be hardware and/or software (e.g., threads, processes, computing devices). The servers 1304 can house threads to perform transformations by employing the architecture, for example. One possible communication between a client 1302 and a server 1304 can be in the form of a data packet adapted to be transmitted between two or more computer processes. The data packet may include a cookie and/or associated contextual information, for example. The environment 1300 includes a communication framework 1306 (e.g., a global communication network such as the Internet) that can be employed to facilitate communications between the client(s) 1302 and the server(s) 1304.

Communications can be facilitated via a wire (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
a provisioning component configured to provision a secret for use with an ephemeral account prior to creation of a friendly name included with the ephemeral account, the secret provisioned prior to or at a same time as creation of the user account by a messaging service provider;
a signing component configured to receive the ephemeral account from the provisioning component and to sign the ephemeral account with the secret to generate a signed ephemeral account and return the signed ephemeral account to a user of the user account;
an address book of the network gateway configured to receive the signed ephemeral account from the signing component and store the ephemeral account and the secret, wherein the network gateway confirms the ephemeral account is valid when the ephemeral account is in the address book, and confirms the signed ephemeral account is signed using the secret when the signed ephemeral account is not in the address book; and
a hardware processor executing computer-executable instructions that implement the provisioning component, the signing component, and the address book.

2. The system of claim 1, wherein the provisioning component provisions the ephemeral account prior to creation of the friendly name.

3. The system of claim 1, further comprising a revocation component configured to revoke the secret in response to revocation of the ephemeral account, and the hardware processor executing computer-executable instructions that implement the revocation component.

4. The system of claim 1, wherein the signing component combines the secret with the friendly name and generates a combination of the secret and friendly name, and the hardware processor executing computer-executable instructions that implement the signing component combines and generates.

5. The system of claim 1, further comprising a validation component of the network gateway, configured to look up the secret in the address book, to validate ephemeral accounts signed with the secret, and the hardware processor executes computer-executable instructions that implement the validation component.

6. A computer-implemented messaging system, comprising:
a provisioning component of a user mailbox configured to provision a secret for use with a temporary email address prior to creation of a friendly name for use with the temporary email address, the secret provisioned at creation of a user account by a messaging service provider;
a signing component of the user mailbox configured to receive the temporary email address from the provisioning component and to sign the temporary email address with the secret to create a signed temporary email address and return the signed temporary email address to user of the user account;
an address book of a network gateway configured to store the temporary email address and the secret;
a validation component of the network gateway configured to validate incoming email messages directed to the signed temporary email address subsequent to provisioning and signing, wherein the validation component confirms the temporary email address is valid when the temporary email address is in the address book, and confirms the signed temporary email address is signed using the secret when the signed temporary email address is not in the address book; and
a hardware processor executing computer-executable instructions that implement the provisioning component, the signing component, the address book, and the validation component.

7. The system of claim 6, wherein the signing component generates a single secret for each user and multiple temporary email addresses can be generated using the single secret.

8. The system of claim 6, wherein the signing component generates a plurality of secrets for each user and multiple temporary email addresses are generated that correspond to the secrets.

9. The system of claim 6, wherein the signing component returns the signed temporary email address, which comprises a user identifier, the friendly name, and an encrypted string that includes the secret.

10. The system of claim 9, wherein the encrypted string is derived from an operation on a combination of the secret and the friendly name.

11. The system of claim 6, wherein the validation component further comprises a restriction component configured to restrict incoming email messages to email messages having the temporary email address signed with the secret and a user-defined domain name.

12. A computer-implemented method of messaging, comprising acts of:
provisioning a secret prior to or at a same time as creation of a user account of a user via a messaging provider, and prior to generating a temporary email address and a friendly name for the temporary email address;
propagating the temporary email address and the secret to an address book of a network gateway;
signing the temporary email address with the secret to create a signed temporary email address, and returning the signed temporary email address to the user;
upon receipt of incoming email messages directed to the signed temporary email address, looking up at least one of the temporary email address or the secret in the address book;
validating the incoming email messages directed to the signed temporary email address subsequent to the acts of provisioning and signing, wherein validating confirms the temporary email address is valid when the temporary email address is in the address book, and confirms the signed temporary email address is signed using the secret when the signed temporary email address is not in the address book; and
utilizing a hardware processor executing instructions stored in memory to perform the acts of provisioning, propagating, signing, looking up, and validating.

13. The method of claim 12, further comprising provisioning the temporary email addresses prior to creation of the friendly name.

14. The method of claim 12, further comprising revoking the secret in response to revocation of the temporary email address.

15. The method of claim 12, wherein the signing comprises generating a single secret for each user, and wherein generating the temporary email address comprises generating a plurality of temporary email addresses using the single secret.

16. The method of claim 12, wherein the signing comprises generating a plurality of secrets for each user, and wherein generating the temporary email address comprises generating a plurality of temporary email addresses that correspond to the plurality of secrets.

17. The method of claim 12, wherein signing comprises returning a signed email address that comprises a user identifier, the user-supplied friendly name, and an encrypted string including the secret.

18. The method of claim 17, further comprising generating the encrypted string by concatenating the secret with the friendly name to generate a hash of the secret and the friendly name.

19. The method of claim 12, further comprising restricting incoming email messages to email messages having the temporary email address signed with the secret and a user-defined domain name.

* * * * *